July 16, 1963  H. ALVIK  3,097,703
DIGGING MACHINE
Filed Oct. 4, 1961  4 Sheets-Sheet 3
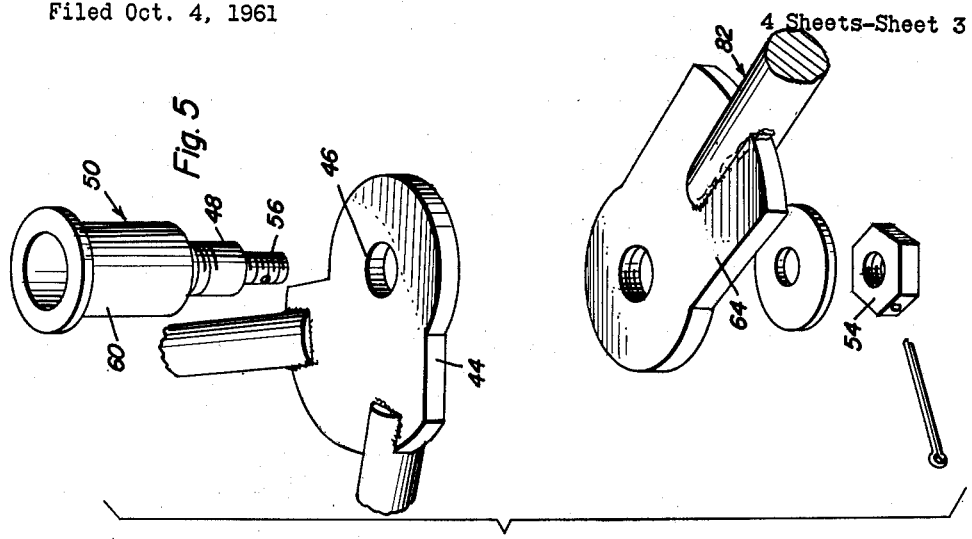
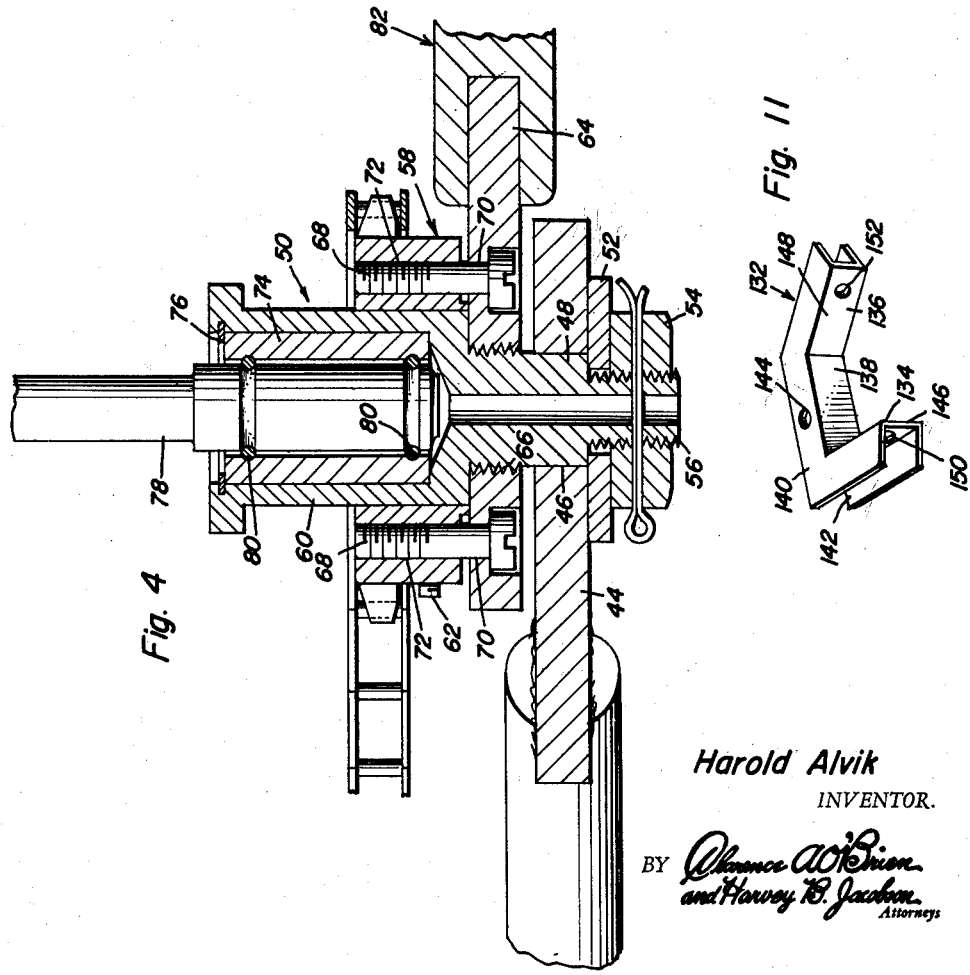
Harold Alvik
INVENTOR.

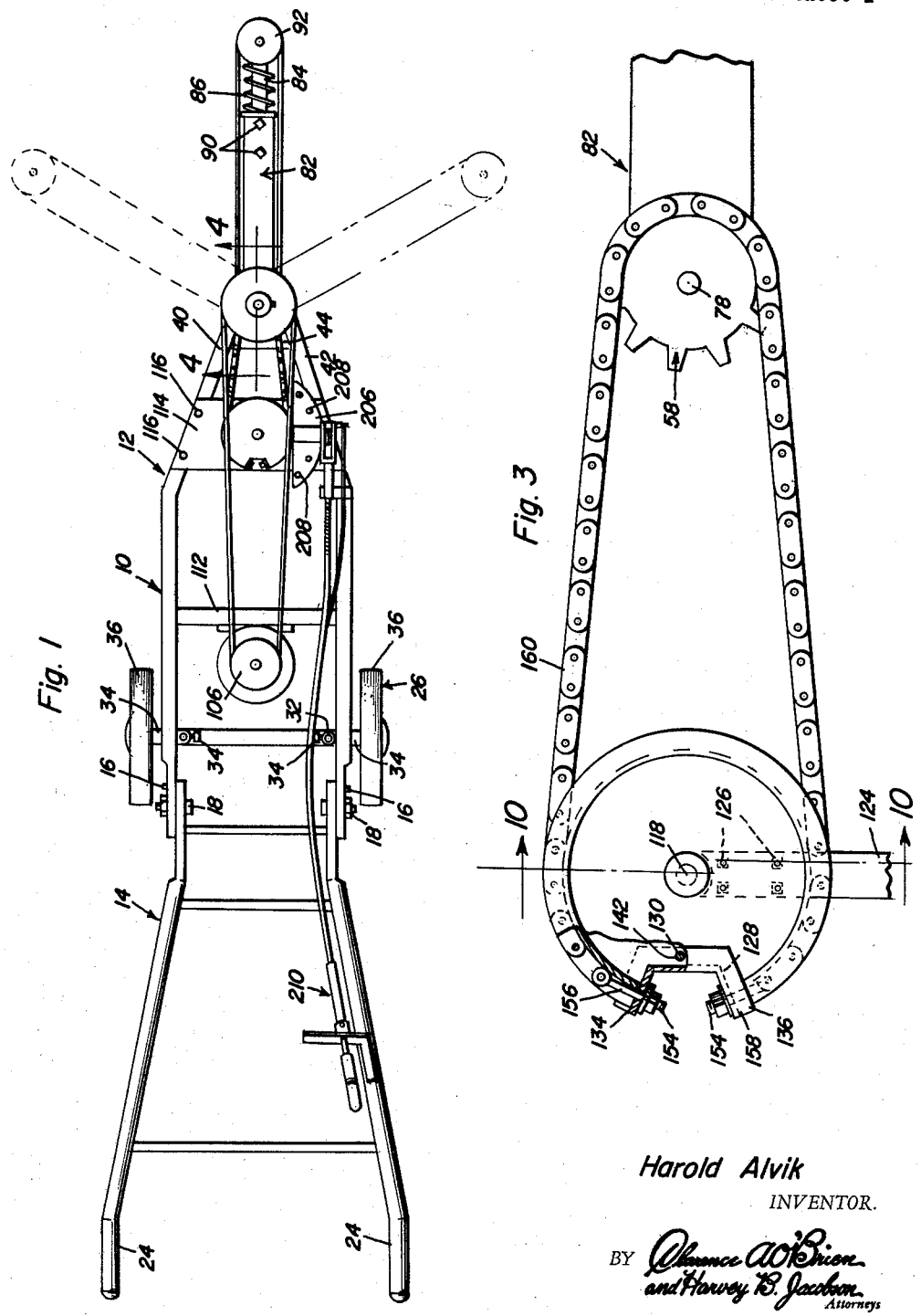

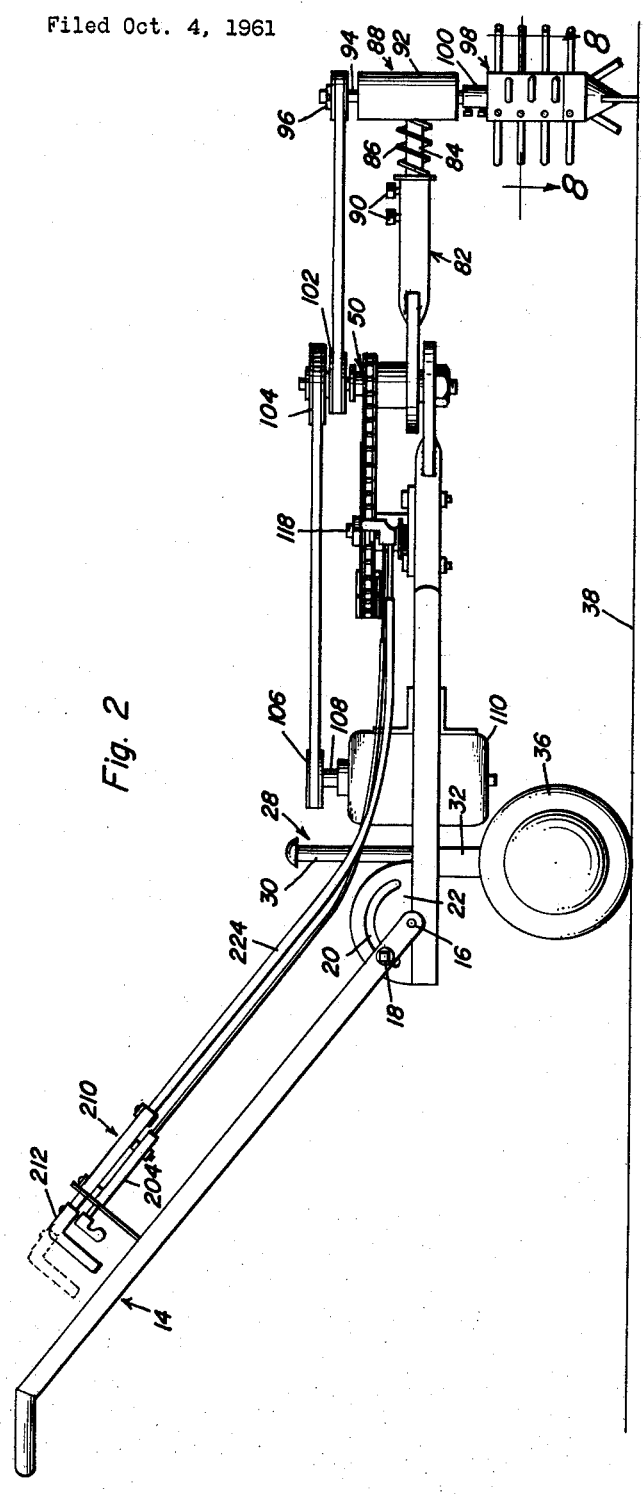

July 16, 1963
H. ALVIK
3,097,703
DIGGING MACHINE
Filed Oct. 4, 1961
4 Sheets-Sheet 4
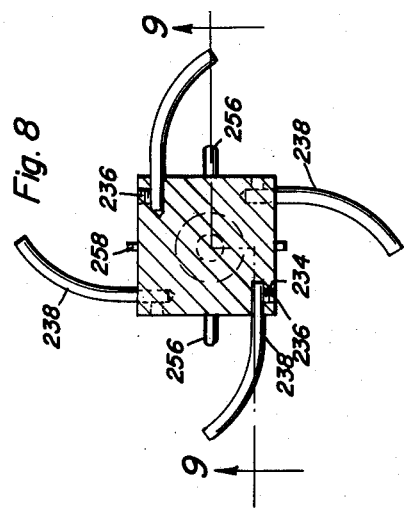
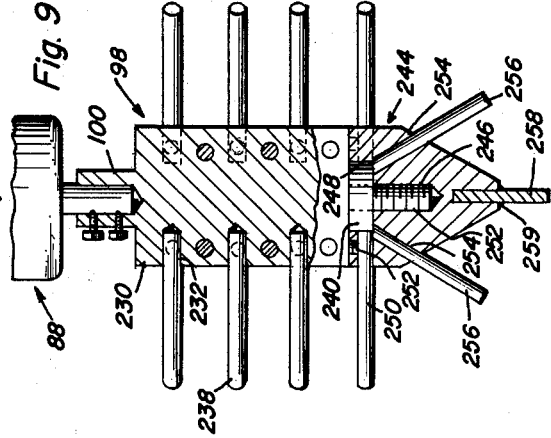
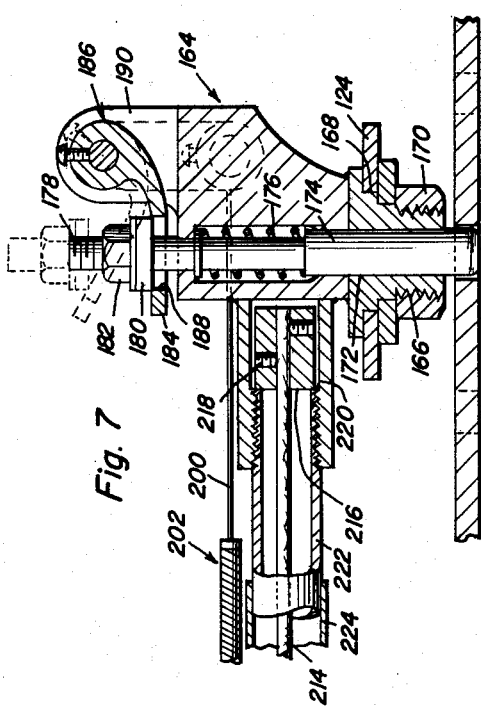
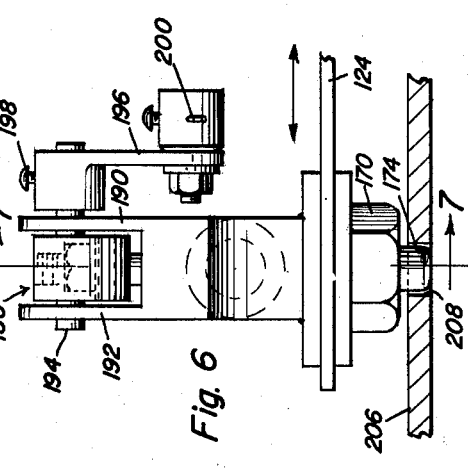
Harold Alvik
INVENTOR.

United States Patent Office 3,097,703
Patented July 16, 1963

3,097,703
DIGGING MACHINE
Harold Alvik, 10767 Oregon Ave., Culver City, Calif.
Filed Oct. 4, 1961, Ser. No. 142,875
8 Claims. (Cl. 172—43)

This invention relates to a novel and useful digging machine and to a digging machine which is specifically adapted to work localized soil areas such as flower beds and the like.

While the digging machine of the instant invention may also be used to cultivate between rows of plants, it has as its specific purpose and object to provide a digging machine which may be readily transported from one location to another and utilized in more or less confined areas for cultivating purposes.

A further object of this invention, in accordance with the preceding object is to provide a digging machine which may readily be used to cultivate raised flower beds which are confined to a small area and from a level disposed below the level of the raised flower bed.

A still further object of this invention is to provide a digging machine with ground engaging support means and which may be readily transported from one location to another but which is provided with rotatable soil working means which may be moved relative to the main portion of the digging machine in order that the latter may be stationarily positioned adjacent a confined area to be cultivated and the rotary soil working means may be moved through the confined area to be cultivated.

Another object of this invention is to provide a digging machine comprising an elongated support frame having handle means carried by one end of the frame, rotary soil working means supported from the other end of the frame, and wheel suspension means carried by the frame intermediate the soil working means and the handle means whereby the wheeled suspension means may be used as a fulcrum point for pivoting the frame of the digging machine about a horizontally disposed axis to raise and lower the soil working means upon the lowering and raising of the handle means.

Yet another object of this invention is to provide wheeled suspension means including ground engaging wheels which may be adjusted vertically relative to the frame of the digging machine.

Another object of this invention is to provide releasable means for retaining the rotary soil working means in adjusted positions relative to the frame of the digging machine.

A final object to be specifically enumerated herein is to provide a digging machine in accordance with the preceding objects which will conform to conventional forms of manufacture, be of simple construction and easy to use so as to provide a device that will be economically feasible, long lasting and relatively troublefree in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the digging machine;

FIGURE 2 is a side elevational view of the digging machine;

FIGURE 3 is an enlarged fragmentary top plan view of the digging machine showing the manner in which the support arm for the rotary soil working means is mounted for pivotal movement about a vertical axis;

FIGURE 4 is an enlarged vertical longitudinal sectional view taken substantially upon the plane indicated by the section line 4—4 of FIGURE 1;

FIGURE 5 is an enlarged exploded perspective view of the pivotal connection between the frame of the digging machine and the support arm for the rotary soil working means;

FIGURE 6 is a fragmentary transverse vertical sectional view on somewhat of an enlarged scale and showing the manner in which the support arm may be retained in selected rotated positions;

FIGURE 7 is a fragmentary vertical longitudinal sectional view taken substantially upon the plane indicated by section line 7—7 of FIGURE 6;

FIGURE 8 is an enlarged horizontal sectional view taken substantially upon the plane indicated by section line 8—8 of FIGURE 2;

FIGURE 9 is a fragmentary vertical sectional view taken substantially upon the plane indicated by section line 9—9 of FIGURE 8;

FIGURE 10 is a transverse vertical sectional view taken substantially upon the plane indicated by section line 10—10 of FIGURE 3;

FIGURE 11 is a perspective view of the chain anchor illustrated in FIGURE 3;

FIGURE 12 is a perspective view of a modified form of soil working member; and

FIGURE 13 is a perspective view of a further modified form of soil working member.

Referring now more specifically to the drawings and to FIGURES 1 and 2 in particular, the digging machine of the instant invention is generally designated by the reference numeral 10 and may be seen to include a generally horizontally disposed frame 12.

A handle assembly generally referred to by the reference numeral 14 is pivotally secured to the rear end of the frame 12 as at 16 for movement about a horizontal axis extending transversely of the frame and of the handle assembly 14. A pair of friction fasteners 18 are carried by the end of the handle assembly adjacent the frame 12 and are each received through an arcuate slot 20 formed in a corresponding selector plate 22. The friction fasteners 18 may be tightened to secure the handle assembly 14 in adjusted rotated positions relative to the frame 12. It will be noted that the free end of the handle 14 includes a pair of handle grips 24 for manipulation by the user of the machine 10.

A wheeled suspension assembly generally referred to by the reference numeral 26 is provided and includes a pair of L-shaped axle members generally referred to by the reference numeral 28. Each axle member 28 includes an upstanding leg 30 which is slidingly disposed in a corresponding upstanding sleeve 32 secured to the frame 12 in any convenient manner and each sleeve 32 includes spring detent means 34 for releasable engagement in one of a plurality of apertures formed in the corresponding leg 30. Each axle member 28 also includes a horizontally disposed leg or spindle portion 34 on which there is journalled a ground engaging wheel 36. The spring detent means 34 not only serve to individually vertically adjust the ground engaging wheels 36 but also to retain the legs 30 in position against rotation about longitudinal axes in the sleeves 32. Accordingly, it may be seen that the ground engaging wheels 36 may be raised and lowered relative to the ground 38.

With attention now directed to FIGURES 1, 2 and 4 of the drawings it will be noted that the forward end of the frame 12 includes a pair of rearwardly divergent sides 40 and 42 which are secured together at their forward ends by means of a bracing plate 44. The plate 44 is provided with a vertical bore 46 in which there is journalled a reduced neck portion 48 of a swivel pin generally referred to by the reference numeral 50. The lower end of the swivel pin 50 is secured to the bore 46 by means of a washer 52 and a nut 54 engaged with the reduced externally threaded lower end portion 56 of the swivel pin. A sprocket wheel generally referred to by the reference numeral 58 is secured to the upper cylindrical portion 60 of the swivel pin 50 by means of a setscrew 62 and it will be observed that a mounting plate 64 is threadedly engaged with the swivel pin 50 as at 66 and is secured to the sprocket wheel 58 by means of fasteners 68 secured through the countersunk bores 70 formed in the mounting plate 64 and in the threaded bores 72 formed in the sprocket wheel 58.

A sleeve 74 is secured in the cylindrical portion 60 by means of a snap ring 76 and rotatably journals the lower end of an intermediate shaft 78. It will be noted that O-ring seals 80 are provided for sealing both the lower end and the upper end of the sleeve 74 from the entrance of foreign material between the sleeve 74 and the shaft 78.

The support arm is generally referred to by the reference numeral 82 and is secured at one end to the mounting plate 64 in any convenient manner such as by welding. The support arm 82 is provided with a longitudinal bore on its end remote from the mounting plate 64 and an adjustment shaft 84 is telescopingly received in the free end of the arm 82 and is normally urged to an outermost position by means of a compression spring 86 disposed between the free end of the support arm 82 and the auger assembly generally referred to by the reference numeral 88 carried by the outer end of the shaft 84. Setscrews 90 are provided for maintaining a given telescopic engagement of the shaft 84 with the support arm 82. The auger assembly 88 includes a bearing sleeve portion 92 through which there is journalled a driven shaft 94. The upper end of the driven shaft 94 has a pulley 96 secured thereto in any convenient manner and a rotary soil working member generally referred to by the reference numeral 98 is secured to the lower end of the shaft 94 by means of a coupling 100.

The upper end of the intermediate shaft 78 has a pulley 102 mounted thereon in alignment with the pulley 96 and an uppermost pulley 104 mounted thereon in alignment with the drive pulley 106 carried by the output shaft 108 of the motor 110 mounted on the cross member 112 of the frame 12. The motor 110 may be of any conventional type although an electric motor has been illustrated in the drawings.

Accordingly, upon rotation of the shaft 108 of the motor 110, the shaft 94 and the soil working member 98 will be rotated about a vertically disposed axis.

A transverse brace member of mounting plate 114 is secured to the frame 12 in any convenient manner such as by fasteners 116 and a pivot shaft 118 is secured therethrough in any convenient manner such as by a threaded fastener 120, and has a double flanged wheel 122 rotatably mounted thereon. One end of a lever arm 124 is secured to the wheel 122 in any convenient manner such as by fasteners 126 and it will be noted that the peripheral edge portion of the wheel 122 is notched as at 128 and has a chain anchor secured therein by means of a fastener 130. The chain anchor is generally U-shaped in plan and is also U-shaped in cross section. The anchor generally referred to by the reference numeral 132 includes a pair of legs 134 and 136, see FIGURES 3 and 11 which are interconnected by means of a bight portion 138. The upper and lower flanges 140 and 142 of the bight portion 138 are provided with aligned apertures through which the fastener 130 is secured. It will be noted that the wheel 122 includes an aperture 142 which is registered with the apertures 144 formed in the flanges 140 and 142 for the reception of the fastener 130.

The bight portions 146 and 148 of the legs 134 and 136 are apertured as at 150 and 152 respectively for receiving the shank portions 154 of the fasteners 156 and 158 respectively which are carried by the opposite ends of a link chain 160. Thus, the opposite ends of the link chain 160 are secured to the wheel 122 and it will be noted that the link chain 160 is entrained about the sprocket wheel 58. Accordingly, upon oscillation of the free end of the lever arm 124 the wheel 122 will be oscillated about its vertically disposed axis of rotation and the swivel pin 50 will also be oscillated imparting swinging movement to the free end of the mounting arm 82 and the soil working member 98 carried thereby.

With attention now directed to FIGURES 6 and 7 of the drawings it will be noted that the free end of the lever arm 124 has a detent means generally referred to by the reference numeral 164 secured thereto by means of a threaded shank portion which is secured through an opennig 168 formed in the lever arm 124 by means of a threaded fastener 170.

The shank portion 166 has a longitudinal bore 172 formed therein and it will be noted that a detent member 174 is slidably disposed in the bore 172 and spring urged to a downwardmost position such as that illustrated in FIGURES 6 and 7 of the drawings by means of a compression spring 176. The upper end of the detent member is provided with a threaded end portion 178 on which there is secured a stop member 180 by means of a threaded fastener 182. One arm 184 of a bell crank generally referred to by the reference numeral 186 has a slot 188 formed therein through which the detent member 74 projects. The bell crank 186 is pivotally secured between the furcations 190 and 192, by means of shaft 194. Actually, the bell crank 186 comprises a pair of lever arms 184 and 196. The other lever arm 196 is mounted on the shaft 194 by means of a setscrew 198 and is connected at its end remote from the shaft 194 to one end of the core 200 of a Bowden cable 202. The Bowden cable 202 extends upwardly from the detent means 164 and terminates in an operating handle assembly 204 carried by the handle assembly 14. Accordingly, upon actuation of the handle assembly 204, the detent member 174 may be raised from the positions illustrated in FIGURES 6 and 7 of the drawings.

It will be noted that a quadrant plate 206, see FIGURE 1, is secured to the plate or brace 114 in any convenient manner and that it is provided with a plurality of apertures 208 which are registerable with the lower end of the detent member 174 for reception of the latter to releasably retain the lever arm 124 in adjusted rotated positions about the shaft 118.

It will be noted from FIGURES 1, 2 and 7 of the drawings, that a second handle assembly generally referred to by the reference numeral 210 and including an actuator 212 is also mounted on the handle assembly 14 and that the actuator 212 is connected to one end of a flexible pull member 214 whose other end has a stop member 216 mounted thereon by means of setscrews 218. The stop member 218 is held captive within a bore 220 formed in the detent means 164 by means of one end of a pipe section 222 whose other end is telescopingly engaged with the pipe section 224 carried by the handle assembly 210 and through which the end of the flexible pull member 214 adjacent the actuator 212 extends.

In this manner, the actuator 212 may be pulled or pushed as desired to change the position of the support arm 82 as indicated in FIGURE 1 of the drawings after the detent member 174 has been retracted from engagement with the quadrant plate 206 by means of the handle assembly 204.

With attention now directed to FIGURES 8 and 9 of the drawings it will be seen that the soil working member 98 includes an elongated body 230 which is substantially square in cross section and has the coupling 100 mounted on one end. A plurality of transversely extending blind bores 232 are formed in the body 230 and each has a threaded setscrew bore 234 communicated therewith and disposed in substantially right angles thereto for the reception of a setscrew 236 for releasably securing the end of the corresponding earth working element 238 to the body 230.

The earth working elements 238 extend radially outwardly from the body 230 and are curved at their outer ends in the direction of rotation of the body 230.

It will be noted that the lower end of the body 230 has a diametrically reduced portion 240 formed thereon which terminates at its lower end in a threaded shank portion 242 with which an end cap body generally referred to by the reference numeral 244 is threadedly engaged. The shank portion 242 is threadedly engaged in a blind bore 246 formed in the end cap body 244 and the bore 246 is provided with a counterbore 248 for the reception of the diametrically reduced portion 240 of the body 230.

The end cap 244 also has a plurality of generally radially outwardly projecting earth working elements 250 secured thereto by means of setscrews 252. Additionally, the end cap body 244 also has a plurality of circumferentially disposed downwardly and outwardly convergent bores 254 formed therein in which earth working elements 256 are secured. Finally, the lower end of the end cap body 244 has a transverse blade 258 secured thereto in any convenient manner such as by welding 259.

With attention now directed to FIGURES 12 and 13 of the drawings there will be seen a modified form of earth working member generally referred to by the reference numeral 260 which includes a shank portion having a coupler 262 similar to coupling 100 secured to its upper end by means of a setscrew 264. The coupler 262 also includes a setscrew 266 for securing the coupler 262 to the lower end of the shaft 94. The lower end of the soil working member 260 is provided with a rotary blade 268 which may be used as a shallow cultivator or for the purpose of cutting weeds.

A further modified form of soil working member is generally designated by the reference numeral 270 and is illustrated in FIGURE 13 of the drawing and includes a coupler 272 similar to coupler 262. The earth-working or soil working member 270 includes a body generally referred to by the reference numeral 274 which is similar to body 230 but includes a lesser number of earth-working elements corresponding to earth working elements 250, 256 and 258 which are referred to by the reference numerals 276, 278 and 280 respectively. The soil working member 270 is designed for shallow cultivating work whereas the soil working member 98 may be utilized to deeply penetrate the soil.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A digging machine comprising an elongated frame, handle means carried by the rear end of said frame, rotary soil working means, means mounting said soil working means for pivotal movement in a substantially horizontal plane, said mounting means consisting of a support arm, a vertical swivel pin pivotally mounting the support arm on the forward end of the frame in forward projecting relation thereto, a horizontal sprocket wheel secured to the swivel pin, a vertical pivot shaft mounted on the frame in line with and to the rear of said swivel pin, a horizontal wheel rotatably mounted on said pivot shaft, a chain anchor mounted on the periphery of said wheel, an elongated link chain, said link chain being entrained about the sprocket wheel and having the ends thereof being directed in opposite directions about said wheel and secured by said chain anchor, and means for effecting a rotational movement of said wheel and thus a subsequent pivotal movement of the soil working means support arm.

2. The combination of claim 1 wherein the means for effecting the rotational movement of the wheel consists of an elongated lever secured to and extending radially outward therefrom, and an elongated member secured at one end to the outer end of said lever, the other end of said member being slidably mounted on said handle means, longitudinal movement of said member effecting a rotation of the wheel.

3. The combination of claim 2 including a horizontal plate mounted on the frame beneath the outer end of said lever, a plurality of arcuately arranged apertures through said plate, and detent means on said outer end selectively engageable in said apertures for fixing said lever and consequently said support arm and soil working means in a predetermined adjusted position.

4. The combination of claim 3 wherein said detent means includes a vertical bore mounted on said lever, a detent member slidably disposed therein, spring means urging said detent member downwardly so as to orientate the lower end thereof in a plane below the plane of the upper surface of the plate thus providing for the engagement of the detent member within a selected aperture upon the alignment thereof, an adjustable stop provided on the upper end of said detent member, and means for retracting said detent member so as to allow for the rotation of the wheel and pivoting of the support arm.

5. The combination of claim 4 wherein said means for retracting the detent consist of a crank means rotatably mounted adjacent the upper end of said detent member, a first arm on said crank positioned between the upper end of the bore and the stop, a second arm on said crank longitudinally spaced from said first arm, and elongated pull means secured to and extending between said handle means and said second crank arm for effecting an upward rotation of said first crank arm and upward movement of said detent member against the force of said spring means so as to withdraw said detent member from a plate aperture.

6. The combination of claim 5 including motor means mounted on said frame to the rear of and in line with said pivot shaft and swivel pin, a vertical shaft rotatably mounted in axial alignment with said swivel pin, belt and pulley means interconnecting said motor means and said vertical shaft for effecting the rotational driving thereof, and belt and pulley means interconnecting said vertical shaft and said soil working means for effecting a transfer of the rotation of the vertical shaft to the soil working means so as to produce the desired rotation thereof.

7. The combination of claim 1 including motor means mounted on said frame to the rear of and in line with said pivot shaft and swivel pin, a vertical shaft rotatably mounted in axial alignment with said swivel pin, belt and pulley means interconnecting said motor means and said vertical shaft for effecting the rotational driving thereof, and belt and pulley means interconnecting said vertical shaft and said soil working means for effecting a transfer of the rotation of the vertical shaft to the soil working means so as to produce the desired rotation thereof.

8. The combination of claim 7 including wheeled suspension means carried by said frame intermediate said handle means and said soil working means, said suspension means consisting of a pair of transversely spaced ground engaging wheels and means for independently vertically adjusting said wheels relative to said frame, said handle means being elongated and pivotally secured at one end to said rear end of said frame for adjusted movement about a horizontally disposed axis extending transversely of said handle means and said frame.

References Cited in the file of this patent

UNITED STATES PATENTS

| 1,742,563 | Stidger | Jan. 7, 1930 |
| 2,088,141 | Royston | July 27, 1937 |
| 2,614,473 | Yacoby | Oct. 21, 1952 |
| 2,755,718 | Arndt | July 24, 1956 |
| 2,926,437 | Ellicott | Mar. 1, 1960 |
| 2,990,890 | Butterfield | July 4, 1961 |

FOREIGN PATENTS

| 861,596 | Great Britain | Feb. 22, 1961 |